United States Patent [19]
Dransfield et al.

[11] 3,958,661
[45] May 25, 1976

[54] METHOD AND APPARATUS FOR GENERATING SEISMIC WAVES

[75] Inventors: Clifford D. Dransfield, Dallas; Phillip W. Wise, Richardson, both of Tex.

[73] Assignee: Atlantic Richfield Company, Los Angeles, Calif.

[22] Filed: Sept. 6, 1972

[21] Appl. No.: 286,739

[52] U.S. Cl. ............................. 181/117; 181/401
[51] Int. Cl.² ......................................... G01V 1/02
[58] Field of Search ......... 181/.5 NC, .5 XC, .5 EC, 181/113, 114, 116, 117, 121, 401

[56] References Cited
UNITED STATES PATENTS

| 2,993,554 | 7/1961 | Towell et al. | 181/.5 NC |
|---|---|---|---|
| 3,215,223 | 11/1965 | Kirby | 181/.5 NC |
| 3,368,642 | 2/1968 | Kilmer | 181/.5 NC |
| R26,893 | 5/1970 | McCollum | 181/117 |

FOREIGN PATENTS OR APPLICATIONS

| 402,032 | 11/1966 | Australia | 181/.5 NC |
|---|---|---|---|

*Primary Examiner*—Richard A. Farley
*Assistant Examiner*—Gregory E. Montone
*Attorney, Agent, or Firm*—Robert M. Betz

[57] ABSTRACT

An apparatus for generating seismic waves includes an elongated closed tube with a piston in its internal cavity. The piston is carried by a piston rod which extends through the top of the tube, and includes a fuel inlet and exhaust channel. The piston also carries a second tube to define a combustion chamber therein, and a fuel conducting tube extending along the length of the piston rod and beyond the piston to approximately medially within the second tube. When a combustion fuel is introduced to within the combustion chamber and ignited, a force is applied to the piston in one direction and an opposite force is applied to the tube moving the tube with respect to the piston a distance approximately three times the diameter of the piston.

A method for generating seismic waves is carried out with the apparatus of the invention and includes the steps of suspending a weight above a surface below which the seismic waves are to be introduced and applying a combustion force to the suspended weigh to accelerate it onto the surface to generate the seismic waves.

22 Claims, 2 Drawing Figures

METHOD AND APPARATUS FOR GENERATING SEISMIC WAVES

BACKGROUND OF THE INVENTION

1. Field of the Invention

This invention relates to improvements in methods and apparatuses for seismic exploration, and more particularly, to improvements in methods and apparatuses for generating seismic waves.

2. Description of the prior art

In carrying out seismic exploration of subterranean formations, beneath, for example, the surface of the earth or the floor or bed of a body of water or the like, many types of apparatus for generating seismic or acoustic waves have been advanced. Presently, and for many years in the past, seismic waves have been generated by detonating an explosive charge, such as dynamite or the like, placed in a hole drilled at the desired wave initiating point. The waves generated travel outwardly from the point of explosion into the earth to be reflected by subterranean formations, the reflections being then detected on the surface at one or more geophones or other seismic wave detectors, and recorded for subsequent analysis. The use of an explosive charge, however, encompasses several undesirable limitations. First, the particular explosive charge used requires strict adherence to safety precautions to prevent catastrophic results from premature or accidental detonation. Secondly, ordinarily a large number of "shots" or explosions are required to achieve a sufficient record for analysis, and a large number of holes within which the explosive charges are located must be drilled. The drilling of such holes is not only expensive, but is time-consuming as well. Nevertheless, the dynamite or explosive charge method has continued to be popular in use, especially since the resulting acoustic or seismic waves they generate resemble a mathematical "impulse," which may be easily mathematically analyzed to determine useful information, such as the type, depth, and location of the subterranean subsurfaces, and so forth.

In recent years, mechanical apparatuses have been receiving increased interest for replacing the traditional use of dynamite or other explosive charge. One relatively uncomplex system involves simply dropping a large weight to impart its kinetic energy to the earth, thereby generating seismic waves for detection.

Other recently advanced apparatuses include gas explosion devices, many of which, in general, employ a large diameter striker plate forming a portion of a combustion chamber. The large striker plates are typically on the order of 24, 36, and sometimes 70 inches in diameter with a relatively large piston disposed above it within the chamber. The striker plate is oridinarily placed directly onto the surface of the ground at the point from which the seismic waves are to be generated, and a large weight exerted on the piston. (In many instances, the apparatus is disposed or located directly on the ground without a large mass resting on the piston to enable it to "bounce" into the air after the explosion has occurred.) The piston characteristically is sealed against pressure leaks between the cylinder and the piston by a large "O" ring. An explosion producing gas, such as propane or the like, is introduced into the small volume combustion chamber between the striker plate and the piston and ignited, causing the striker plate to rapidly move downwardly to impart energy into the ground. At the same time, the combustion explosion forces the piston upwardly, typically ¼ to 1-½ inches, or more, to overcome the weight, if any, resting upon it.

In both the falling weight system and the gas explosion system, catching devices are sometimes employed to prevent secondary impacts against the earth which may generate unwanted noise signals. Thus, for example, in combination with weight dropping apparatuses, systems may be employed which secure and raise the mass after the initial impact of the mass onto the ground to prevent it from bouncing or otherwise reimpacting upon the ground. Likewise, in the gas explosion devices, mechanisms are frequently incorporated which "catch" the striking plate and reacting mass which, if otherwise unrestrained, would "bounce" after the explosion.

Ordinarily, the weight dropping and explosion seismic wave generators are of relatively large size, overall weights of 2,000 to 8,000 pounds not being uncommon. Since the generators necessarily must be transported among the sites of interest, they frequently are suspended in pairs from the sides or end of a bed of a truck, which may be driven to remote locations desired for testing. The generators, being of such large size and weight, are usually symmetrically balanced about a common axis of the truck to equalize the load presented. Thus, for example, frequently two or more gas explosion generators are symmetrically mounted on brace structures off opposite sides of the truck, but nevertheless, present significant impediments to the truck's maneuverability.

In addition, another of the inherent characteristics of the presently used gas explosion generators and weight dropping apparatuses is that their use in swampy, muddy, or mucky areas is difficult because of the maneuverability problem caused by their large weight, and because after firing, the large plate becomes embedded in the soft surface upon which it has been fired, and is difficult to remove because of the suction generated under its surface area. One possible solution to this problem is to provide an elongated structure which does not present a large surface area in contact with the ground. Several elongated structures have been proposed, although apparently none heretofore has recognized the advantage in using an elongated structure in mud or other such mucky areas. One of the elongated structures advanced is the recoil seismic impulse gun of R. A. Peterson, U.S. Pat. No. 3,283,844. In that embodiment, two pistons are disposed within an upstanding vertical cylinder, and a gas explosion is generated between them forcing one up in reaction to the force of the other piston which is forced downwardly onto an anvil and striker plate. The pistons are relatively heavy, being 3,700 pounds and 2,000 pounds, and the anvil is approximately 1,000 pounds. The striker plate upon which the anvil is driven is approximately 4,000 pounds. Thus, the total weight of the Peterson gun is in the neighborhood of 11,000 pounds. It should be noted that the stroke of the 3,700 pound piston is on the order of nineteen inches and the stroke of the 2,000 pound piston is in the neighborhood of 22 inches.

A similar recoilless impulse gun has been proposed by R. A. Kirby in U.S. Pat. No. 3,215,223, which incorporates active and reaction pistons, but rather than presenting an anvil against which one of the pistons is driven, the gun includes a piston rod attached to one of the driven pistons, the piston rod carrying an impacting plate external to the piston cylinder. The Kirby gun also is relatively heavy, the piston and shaft alone being on the order of 1,900 pounds.

Many of the seismic wave generating apparatuses used heretofore employ valve arrangements or assemblies through which the gas or fuel injected into the apparatus is controlled. Commonly, the valves are one-way valves which allow the fuel to flow in a single direction into the combustion chamber of the apparatus, but do not allow the gas to flow out once in the compression chamber. The valves used are relatively complicated, require maintenance, and are not trouble free.

In addition to a significant maintenance requirement for apparatuses employing inlet fuel valves, considerable maintenance is ordinarily otherwise required for most of the apparatuses heretofore advanced. Because of the tremendous shocks generated by the explosions within the compression chamber, not all of which are transferred into the ground, a portion of the energy is absorbed by the apparatus itself and its surrounding elements. Even in apparatuses having very short piston strokes, on the order of one-quarter inch or more, the rapid relative movement between the piston and the wall of the compression chamber generates considerable frictional force and heat and considerable wear and tear on the parts. This situation is further aggravated by the large weights of the components involved.

SUMMARY OF THE INVENTION

In light of the above, it is, therefore, an object of the invention to provide a method and apparatus for generating acoustic or seismic waves within the earth.

It is another object of the invention to provide a lightweight apparatus for generating seismic waves, which can be carried on a truck or the like.

It is yet another object of the invention to provide an apparatus for generating seismic waves, which can be carried above the surface of the earth as an accelerated falling weight.

It is still another object of the invention to present an apparatus for generating seismic waves which is lighter than apparatus used heretofore with respect to the effective magnitude of the wave which can be generated thereby.

It is a further object of the invention to present an apparatus for generating seismic waves which includes a valveless coaxial fuel entry and exhaust system.

It is yet a further object of the invention to present an apparatus for generating seismic waves which requires little maintenance and upkeep.

It is still a further object of the invention to present an apparatus and method for generating seismic waves in marshy or swampy areas, to facilitate ease of removal of the apparatus from the impacted surface.

It is another object of the invention to present an apparatus for generating seismic waves which has a ratio of travel to diameter of the piston of approximately three to one.

It is still another object of the invention to present a method and lightweight apparatus for generating seismic waves having an equivalent power output as apparatuses having the same or larger fuel capacities.

It is another object of the invention to present a method and apparatus for generating seismic waves of optimum power for the weight of the impacting mass to the filling charge ratio.

These and other objects, features, and advantages will become apparent to those skilled in the art from the detailed description hereinafter set forth when read in conjunction with the appended claims and accompanying drawing.

The invention, in its broad aspect, presents a seismic wave generator which includes a piston disposed within an elongated first tube which is enclosed at its top and bottom. The piston is carried upon a piston rod having a hole along its interior length for exhausting combustion gases, the piston rod extending through a hole in the top of the first tube. A second tube is carried by the piston coaxially with the first tube to define a combustion chamber within the first and second tubes. A fuel conducting tube extends within the piston rod to approximately the middle of the combustion chamber so that when a combustion fuel is introduced within the combustion chamber through the fuel conducting tube and ignited, a force is applied to the piston in one direction and a force is applied to the tube in an opposite direction, and as the first tube impacts a ground surface, seismic waves are generated.

Also, the invention, in its broad aspect, includes a method for generating seismic waves in which a weight is suspended above a surface at which the seismic waves are to be generated and a combustion force is applied to the suspended weight to accelerate it onto the surface to generate the seismic waves.

In a preferred alternative embodiment of the invention in its broad aspect, a method for generating seismic waves is presented in which an elongated cylinder having a centrally-located cavity is provided, and a piston is disposed within the cavity. A piston rod carrying the piston is secured to a mounting frame, and a combustion fuel is ignited within the cavity to move the elongated tube a distance with respect to the piston approximately three times the diameter of the piston.

BRIEF DESCRIPTION OF THE DRAWING

The invention as illustrated in the accompanying drawing, wherein.

DETAILED DESCRIPTION OF THE PREFERRED EMBODIMENTS

Figure 1:
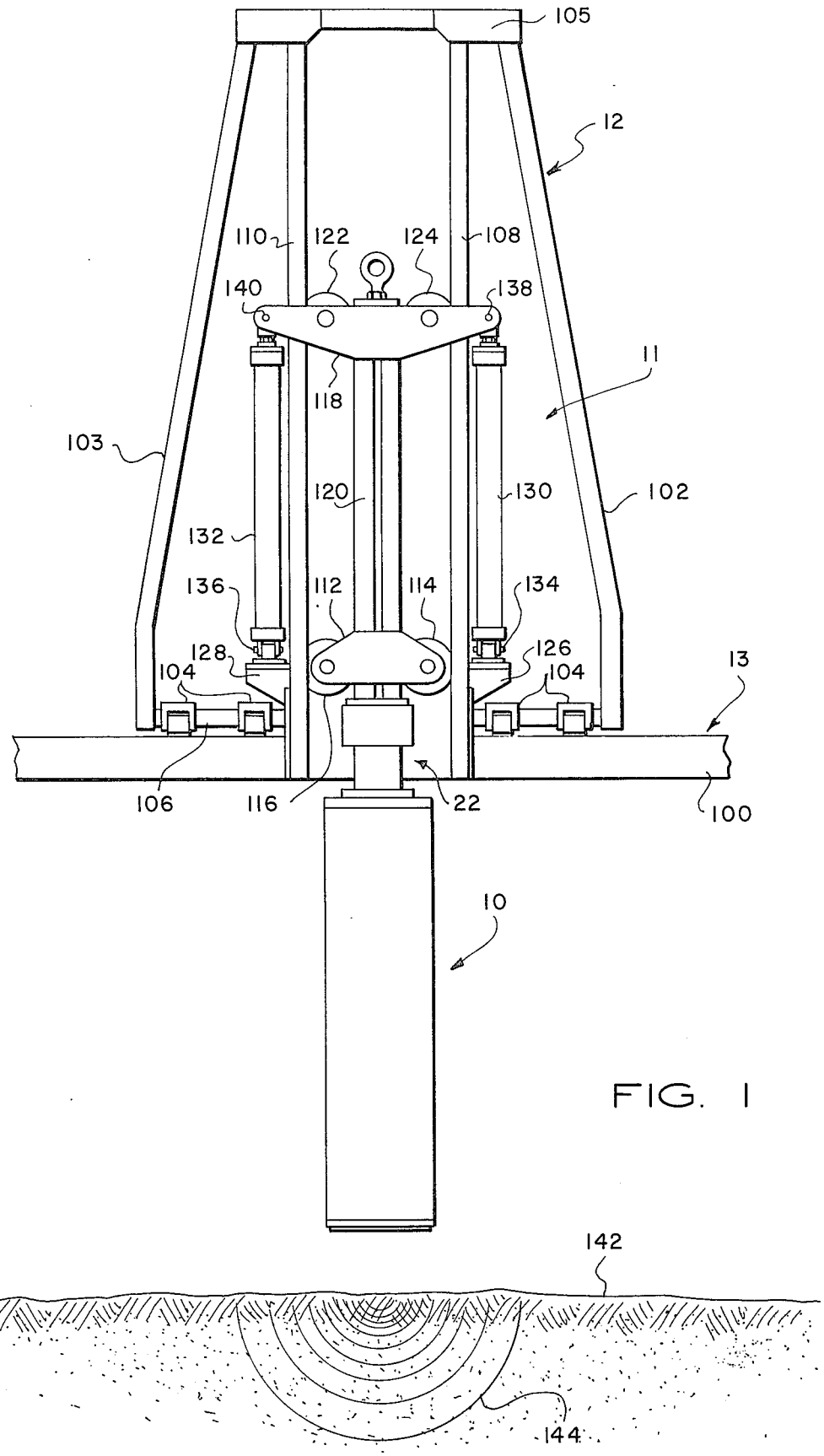
FIG. 1 is a side elevation view of the seismic wave generating apparatus, in accordance with the invention, carried by a catcher mechanism.

The seismic wave generator, in accordance with a preferred embodiment of the invention, illustrated in FIG. 1, includes a gas explosion gun assembly 10 carried by a catcher assembly 11, mounted by a frame 12 onto a bed 13 of a truck (not shown), other vehicle, or the like.

Figure 2:
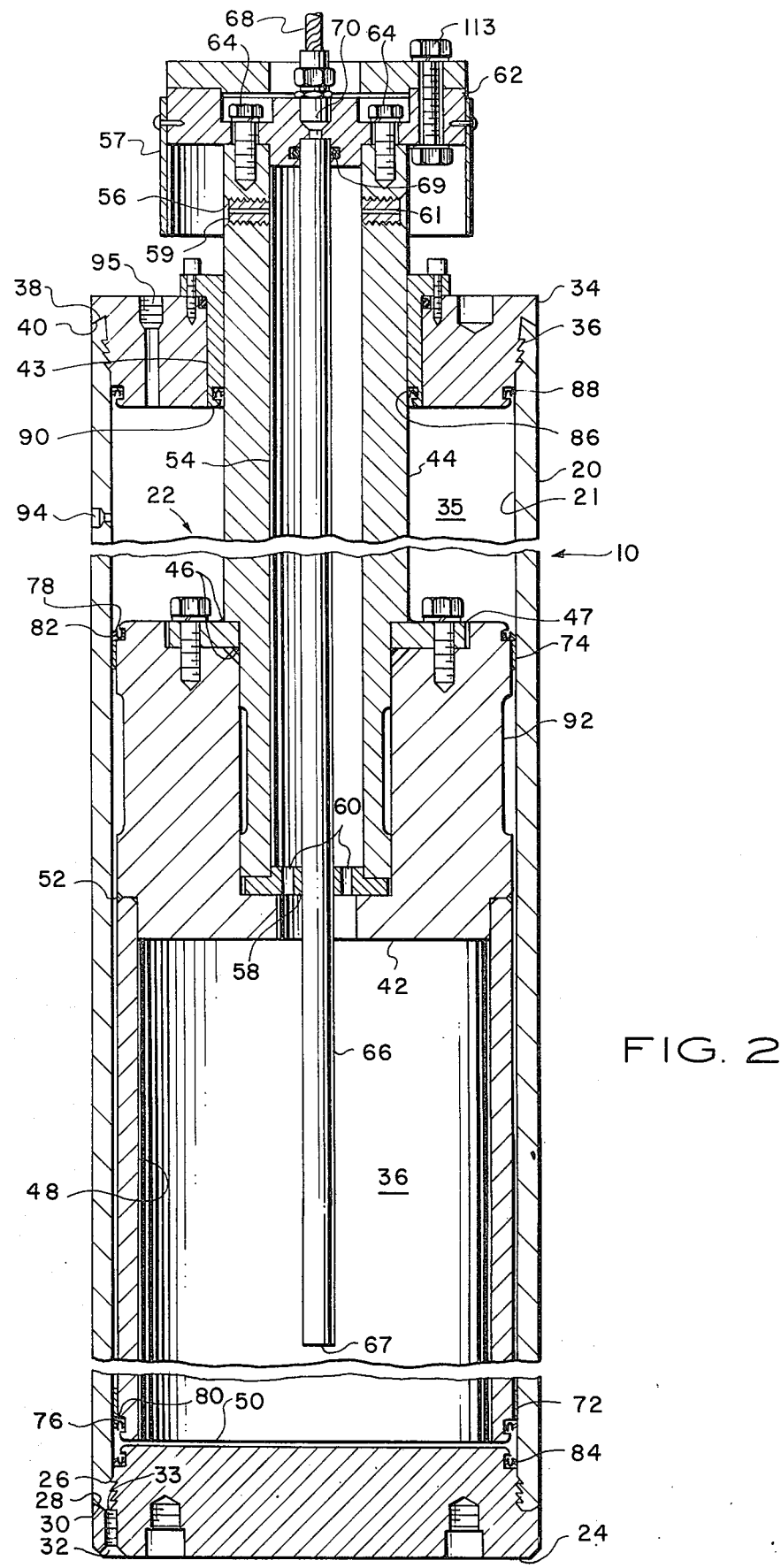
FIG. 2 is a side view, in cross section, of the interior of the seismic wave generating apparatus of FIG. 1.

The gun assembly 10, shown in cross section in FIG. 2, includes an overall cylinder 20 in which is contained a piston assembly 22. Although the overall cylinder 20 and the associated parts are described and illustrated as being of cylindrical configuration, it should be pointed out that other shapes and configurations may be equally advantageously used incorporating the principles of the invention. The cylinder 20 is enclosed by a bottom member 24 which engages the inner wall 21 of the cylinder 20 by buttress threads 26 to present greater resistance opposing upward impacting forces upon the bottom member 24 with respect to the cylinder 20. The bottom member 24, as will become apparent below, is driven or impacted with relatively high energy into a surface of the ground, and additionally forms a cylinder head for an explosion taking place immediately above it. Thus, the buttress threads reduce any tendency of the upward forces upon the bottom member 24 from outwardly spreading the end of the cylinder 20, which would otherwise loosen the mutual engagement between the bottom member 24 and the cylinder 20. Because the impacting forces exerted onto the bottom member 24 are large, the square shoulder of the buttress threads is arranged to resist, to as large a degree as possible, those forces. Additionally, the end 28 of the cylinder 20 can be chamfered at an angle, for example, thirty degrees, as shown, and an overhanging engaging or mating lip 30 can be provided on the bottom member 24 to seal against the chamfer 28 of the cylinder 20. Thus, the high pressures to which the cylinder 20 and end member 24 are subjected will be less inclined to buckle or spread the cylinder walls near the bottom. Maintaining the rotational position of the bottom member 24 in its threadable engagement with the cylinder 20 is a plurality of set screws, set screw 32 being shown for example, extending through the bottom member 24 to engage or bite into the flat 33 of the cylinder 20.

In a similar manner the top of the cylinder 20 is enclosed by top member 34 which, like the bottom member 24, is threadably engaged by buttress threads 36 to the top of the cylinder 20. The top 34 additionally includes an overhanging lip 38 to engage the chamfered end 40 of the cylinder 20.

Coaxially disposed within the cylinder 20 is the piston assembly 22, which includes a main piston mass 42 carried by a piston rod 44. As shown, the piston rod 44 can be welded by welding material 46, or otherwise affixed, to a flange 47 bolted to the piston mass 42. The piston rod 44 is of such length as to carry the piston 42 midway within the cylinder 20 to define a first compression chamber 35 above the piston 42 and a second compression chamber 36 beneath the piston 42, within the cylinder 20. Downwardly extending from the piston mass 42 into the lower compression chamber 36 is a cylinder 48 of diameter slightly less than the wall 21 of the main cylinder 20. The cylinder 48 is of such length that when the piston 42 is at a precombustion position within the compression chamber 36, its end 50 is adjacent the bottom member 24. The cylinder 48 is attached by welding material 52 to the piston 42 to enable it to be carried thereby, and, to effect such welds, the top corners of the cylinder 48, as well as the edge against which the cylinder 48 bears may be cut to receive within a V-shaped notch, as shown, a quantity of weld material. Thus the welding material 52 can be smoothly finished so as not to interfere with the up and down movement of the piston assembly 22.

Along the entire length of the axis of the piston rod 44 is an interior channel of cavity 54 communicating with a plurality of exhaust ports 56 adjacent or near the top of the piston rod 44. Plugs 59 are threadably contained within the exhaust ports 56 and have holes 61 of diameter such as to present the desired back pressure upon the exhaust gases.

A plate 58 having a plurality of holes 60 therethrough between the interior chamber 54 of the piston rod 44 and the combustion chamber 36 encloses the cavity 54 of the piston rod 44. The diameters of the holes 60 are chosen to exert a partial back pressure on the gas flowing therethrough to enable a gas injected into the combustion chamber 36 to be maintained at a desired combustion pressure, as below discussed in detail. The plate 58 is trapped within the piston mass 42 by the downward pressure of the piston rod 44, held in position by the bolted flange 47. Enclosing the top of the piston rod 44 is a top member 62, which may be bolted by bolts 64, or otherwise affixed to the piston rod 44. To prevent the exhaust gases rapidly escaping through holes 56 from causing accidental injury to nearby personnel, a shield 57 can be conveniently located as shown to divert the direct exit forces of the exhaust gas.

Carried by the enclosing member 58 is a fuel conducting tube 66, which is disposed coaxially along its length within enclosing members 62 and 58 and piston rod 44 to open approximately medially within the combustion chamber 36 at the end 67 of the tube 66. The medial outlet of the tube 66 within the compression chamber 36 facilitates scavenging or removing spent combustion gases (not shown) from the combustion chamber. The tube is welded to the plate 58 (welds not shown) and is carried within an "O" ring seal 69 of silicon material or the like at top 62. Thus, as the tube 66 expands or contracts from such as the heat to which it is exposed, it can freely do so within the "O" ring 69. The gas to be conducted to within the combustion chamber 36 may be of any combustible gas, propane, LP gas, or the like, being appropriate. The gas (not shown) is conducted by flexible tube 68 to a fitting 70 to the interior of the conducting tube 66. Although elaborate fuel regulation valves are not required in the operation of the explosion gun 10, a valve (not shown) can be included to isolate the explosion of the combustion fuels within the combustion chamber 36 from the fuel source tanks. Thus, such valve may be of unidirectional type to present no resistance to gas flow through the valve in the direction of the combustion chamber 36, but which opposes gas flow therethrough in a direction away from the combustion chamber 36.

To facilitate relative movement between the cylinder 20 and the piston assembly 22 and to establish compressive isolation between the upper and lower compression chambers 35 and 36, respectively, metal lands or rings 72 and 74 are provided. The lands 72 and 74 are continuous around the circumference of the piston 42 and the cylinder 48, and, as shown, one is located on the cylinder 48 near its bottom 50 and the other is located on the piston 42 near its top, both, of course, bearing onto the inner wall 21 of the cylinder 20. The lands 72 and 74 can be of silicon-bronze or other such material which can withstand the upward and downward frictional forces generated by the relatively long travel of the piston assembly 22.

Additionally sealing the piston assembly 22 from the upper chamber 35 and the combustion chamber 36 are two dynamic seals 76 and 78 disposed respectively in grooves 80 and 82 adjacent the bottom of cylinder 48 and the top of piston 42. The sealing rings 76 and 78 can be of a generally U-shaped member outwardly biased by a spring (not shown) or the like within the interior of the "U", to bear upon the inside wall 21 of the cylinder 20. The seals can additionally contain one or more outstanding ribs (as shown) along its length to further engage the respective walls upon which the members are biased to further implement the seal effect thereof. The seals 76 and 78 should also be of a tough resistant material to withstand the heat and frictional forces present within the cylinder 20. It has been found that a material such as polytetrafluoroethylene impregnated with graphite is suitable for this purpose, such seals being commercially available.

To further seal the interior cavities of the cylinder 20, a static seal similar to the dynamic seal above described can be incorporated into the base member 24, as seal 84, illustrated. Likewise, static seals 86 and 88 are provided within the top member 34 to seal the top chamber 35.

To further facilitate the upward and downward movements of the piston rod 44 within the cylinder 20, a bearing 90 is provided through the hole 43 of the top member 34 through which the piston rod 44 extends. The bearing 90 can be of bronze or other appropriate nonporous bearing material.

Because of the internal and external pressures and forces to which the gas explosion gun 10 are exposed, its various parts are made of durable, strong materials. For example, the top and bottom members 24 and 34 can be made of 17-4 PH stainless steel, and the cylinder 20 of 1018 cold drawn steel tubing. The gas conducting tube 66 can be of 3-16 stainless steel tubing of, for instance, ⅝ inch outer diameter.

Because the upward and downward movement of the piston may be numerously repeated over its long travel, the inside wall 21 of the cylinder 20 can be honed to a relatively fine finish, for example, to within 10 or 20 microinches along the length of the cylinder 20. To further reduce the upward and downward friction generated by the piston 42 and the cylinder 48, the entire piston assembly can be treated with a molybdenum disulfide coat. The coat can be applied and left to stand for several hours before the piston assembly 22 is inserted to allow the coat to bond with the material of the parts of the piston assembly. Additionally, after the bonding of the molybdenum disulfide coat has been effected, the piston assembly 22 can be coated with a grease compatible with the silicon of the lands 72 and 74, such as a fluoro-silicon grease. A reservoir for the grease is provided by slot 92 formed around the circumference of the piston mass 42. Because the apparatus, as a whole, can be sealed as a total assembly, a hole 94 can be provided extending through the wall 20 to enable grease to be inserted or injected into the reservoir 92 of the piston 42 with the piston assembly 22 in a raised position (not shown).

With the various parts of the apparatus of the materials above described, with a size of ten inches in diameter and sixty inches in length, the overall weight of the apparatus is approximately 600 pounds. It can be seen that this weight and size facilitate ease of movement and handling. Also, because of the seals, lubricants, and other materials, and of the facility for providing additional lubrication materials, the apparatus requires little maintenance or upkeep.

The gun 10 can be carried by an appropriate carrier, such as the catcher assembly 11, shown in FIG. 1. The catcher assembly 11 as illustrated can be mounted onto a bed 100 of a truck or the like by a frame 12 rotatably carried upon hinges 104, or the like. The frame 12 includes upstanding brace members 102 and 103 attached together by top member 105 and to the hinges 104 by a bottom cross member 106. Interconnecting the top and bottom members 105 and 106 are two parallel channels 108 and 110, conveniently of channel iron, or the like. Disposed between the channel members 108 and 110 is a holder assembly for the gun assembly 10, which rides up and down between the parallel channel members 108 and 110. The holder assembly includes a lower front frame 112 in which wheels 114 and 116 are rotatably journaled with a corresponding lower rear frame (not shown) to ride within interior channels of the channel members 110 and 108, respectively. Likewise, an upper frame 118 (the corresponding upper rear frame is not shown) is connected by the braces 120 to the lower frame 112, and includes rotatably journaled wheels 122 and 124. The members of the upper frame 118 extend beyond the members 108 and 110 to receive the top elements of shock absorbers 130 and 132 in rotatable engagements 138 and 140. The bottom elements of the shock absorbers 130 and 132 are rotatably self-aligning and connected by bolts 134 and 136 to outstanding ears 126 and 128.

The shock absorbers 130 and 132 can be specially fabricated to present little or no resistance to upward forces exerted thereupon, but to exert a dashpot action to resist downward forces, for operation as below described.

The bottom frame 112 can be connected by bolts 113 or the like to the top member 62 (see FIG. 2) of the piston rod 44 of gun assembly 10. As described hereinabove, the widely used gas explosion devices of the prior art were operated with a large plate or mass in direct contact with the surface of the ground from which the seismic wave is to be generated. It has been discovered, however, seismic waves of large magnitude are generated by the secondary impact or bounce impact of the devices falling as a free body to the ground. This secondary impact, in fact, is in many cases larger than the primary impact. It has, therefore, been discovered that seismic waves can be very efficiently generated by accelerating a mass onto the ground, thereby simulating both a secondary impact of a gas explosion gun and a falling mass, but without the cumbersome bulk, weight, and other handling problems of the falling weight systems. One of the particular advantages of the gun assembly 10 of the invention is that it can be carried at any desired height from the ground, for example, 6 to 8 inches above the ground, or, if desired, may rest upon the ground.

In operation, the gun assembly 10 is located as desired, for example, six or eight inches above the surface at which the acoustic or seismic wave is desired to be generated. An amount of combustion fuel or gas (not shown) is introduced via the tube 68, through the gas conducting tube 66 to approximately medially within the combustion chamber 36. As the gas flows into the combustion chamber 36, the existing gases within the combustion chamber, such as the spent exhaust gases from previous combustion and the like, are forced out of the combustion chamber through the holes 60 in the enclosing plate 58, the cavity 54 and exhaust holes 61. Because of the back pressure exerted upon the gases within the combustion chamber 36 by the holes 61 of the plugs 59, a desired gas pressure can be achieved for combustion.

When the desired charge or quantity and pressure of combustion fuel is introduced into the combustion chamber 36, it is ignited near the top of the gas conducting tube 66, or elsewhere along the length of the inlet tube 68 or other ignition point (not shown). The combustion then traverses the flexible tube 68 and the gas conducting tube 66 and ignites the fuel within the combustion chamber 36. The combustion of the gases, of course, causes expansion thereof which exerts a downward force upon the bottom 24 of the cylinder 20 which carries the entire mass of the cylinder 20 and bottom 24 into contact with the ground 142 (see FIG. 1) to thereby generate the acoustic or seismic wave 144 in the ground.

At the same time, in an equal and opposite reaction to the force of the downwardly moving cylinder 20, the piston assembly 22 moves upwardly encountering practically no resistance from the catcher mechanism 11 and its unidirectional shock absorbers 130 and 132. The piston 42, however, is restrained from striking the top 34 of the cylinder 20 because the gas within the chamber 35 above the piston mass 42 is increasingly pressurized with upward movement of the piston assembly 22 within the cylinder 20 to brake the piston.

A gas inlet port 95 is provided through the top 34 of the cylinder 20 through which additional gas pressure may be maintained within the chamber 35. The particular gas used can be nitrogen or other nonburnable or combustible gas. Additionally, because of the gas maintained in the chamber 35, after combustion within chamber 36, an upward pressure will be exerted by the gas under increasing pressure within the chamber 35 upon the top 34 of the cylinder 20, lifting the entire cylinder mass.

To effect the impact of the cylinder 20 onto the ground, it can be seen that the location of the gun assembly 10 above the ground is a factor of consideration as well as the pressure of the gas within the chamber 35 above the piston 42. Thus, the preignition height of the cylinder 20 above the ground and the pressure within the compression chamber 35 are selected to raise the cylinder 20 after its initial impact to be caught by the catcher mechanism 11 thereby preventing secondary impacts against the earth 142 to generate a seismic signal as perfectly resembling a mathematically defined impulse as possible.

The catcher assembly 11 is in an upwardly extended position (not shown) after firing, and the dashpot action of the shock absorbers 130 and 132 becomes effective to slowly lower the entire assembly back to the position shown in FIG. 1. Additionally, the pressurized gas maintained within the chamber 35 raises the position of the cylinder 20 about the piston assembly 22 to maintain their relative positions, as shown in FIG. 2. Because of the relatively small size of the cylinder 20, the gun assembly 10 can be conveniently used in seismic explorations in swampy, muddy, or mucky areas or terrains. The gun, not presenting a cutting surface, but presenting a substantial impacting surface can be conveniently forced into the mud and fired from the partially submerged location. Because of the small diameter of bottom 24, it can be easily removed from the mud upon which it has impacted. Other such novel uses will become apparent to those skilled in the art.

Although the invention has been described and illustrated with a certain degree of particularity, it is understood that the present disclosure is made by way of example only and that numerous changes in the details of construction and the combination and arrangement of parts may be resorted to without departing from the spirit and scope of the invention as hereinafter claimed.

What is claimed is:

1. A seismic wave generator comprising:
    an elongated first tube, enclosed at top and bottom;
    a piston disposed within said first tube;
    a piston rod having a hole along its interior length for exhausting combustion gases, upon which said piston is carried, extending through a hole in the top of said first tube;
    a second tube carried by said piston coaxially with said first tube to define a combustion chamber therewithin, said second tube being of a substantial length relative to said first tube;
    means on the opposite side of said piston from said combustion zone for containing a gas under pressure to bias said piston toward said combustion chamber;
    a fuel conducting tube extending within said piston rod to approximately the middle of said combustion chamber;
    the ratio of the diameter to the distance said piston travels being one to at least three;
    whereby said generator can be operated with or without initial ground surface contact and when a combustion fuel is introduced within the combustion chamber through said fuel conducting tube and ignited, a force is applied to said piston in one direction and a force is applied to said first tube in an opposite direction, thereby absorbing said force applied to said piston without the use of a special mechanical reaction mass and generating seismic waves when said first tube impacts a ground surface.

2. The seismic wave generator of claim 1 wherein the ratio of the diameter to the distance said piston travels is approximately one to three.

3. The apparatus of claim 1 further comprising means for igniting the combustion fuel within said fuel conducting tube.

4. The seismic wave generator of claim 1 further comprising means for introducing a gas to within said first tube above said piston, whereby the pressure of the gas is increased as said piston travels upwardly to brake the upward movement of said piston and bias said piston with respect to said first tube to a precombustion position.

5. The seismic wave generator of claim 2 further comprising two lands, one encircling said piston near its top adjacent on interior wall of said first tube and the other encircling said second tube at a location away from said piston adjacent the interior wall of said first tube, to reduce the flow of gases between said piston and second tube and the wall of said first tube, as said piston and said first tube travel with respect to each other.

6. The seismic wave generator of claim 5 further comprising two means for sealing gas flow, one disposed within a slot encircling said piston above the land thereon and the other within a slot encircling said second tube below the land thereon.

7. The seismic wave generator of claim 6 wherein said seal comprises a circular welded spring surrounded by a U-shaped polytetrafluoroethylene member, bearing upon the wall of said first tube.

8. The seismic wave generator of claim 7 wherein said piston is treated with molybdenum disulfide and has contained within a slot around its circumference a fluoro-silicon grease.

9. The seismic wave generator of claim 7 wherein the exhaust port exits outwardly from said piston rod at a point thereof outside said first tube.

10. The seismic wave generator of claim 7 further comprising a shield adjacent the hole in the wall of said first tube to baffle the outwardly flowing exhaust.

11. The apparatus for generating an acoustic wave comprising:
- an elongated first cylinder having a top and bottom,
- an enclosing bottom member engaging the bottom of said first cylinder,
- an enclosing top member engaging the top of said first cylinder, and having a hole therethrough,
- a piston within said first cylinder,
- a second cylinder carried by said piston coaxially disposed within said first cylinder to define therewithin a combustion chamber of substantial length relative to said first cylinder,
- means on the opposite side of said piston from said combustion zone for containing a gas under pressure to bias said piston toward said combustion chamber,
- a piston rod carried by said piston extending through the hole in said enclosing top, said piston rod having a cavity along its axial length with at least one hole through a wall thereof outside said first cylinder to exhaust gases from the combustion chamber,
- the ratio of the diameter to the distance said piston travels being one to at least three,
- a fuel conducting tube extending along the length of said piston rod within the cavity therein to approximately the midpoint of the combustion chamber, whereby when combustion fuels are conducted to within the combustion chamber through said fuel conducting tube, the existing gases within the combustion chamber are exhausted through the cavity within said piston rod, and
- means within said gas conducting tube adjacent the top of the piston rod for igniting the combustion fuel therewithin,
- whereby said apparatus can be operated with or without initial ground surface contact and without a special mechanical reaction mass for absorbing force applied to said piston.

12. The apparatus of claim 11 further comprising means for conducting a gas under pressure to within said first cylinder above said piston to bias said piston downwardly.

13. the apparatus of claim 12 wherein the ratio of the length of travel to the diameter of said piston is approximately three to one.

14. The apparatus of claim 13 further comprising two lands, one encircling said piston near its top, the other encircling said second cylinder near its bottom.

15. The apparatus of claim 14 further comprising two U-shaped polytetrafluoroethylene seals, one disposed in a slot encircling said piston adjacent its top above said land thereabout, the other disposed in a slot encircling said second cylinder below said land thereabout.

16. The apparatus of claim 15 wherein each said U-shaped seal has a spring with canted coils in its interior whereby said polytetrafluoroethylene member is extended to engage an interior wall of said first cylinder and the groove within which the seal is disposed.

17. The apparatus of claim 16 wherein said piston and said second cylinder are treated with molybdenum disulfide, and greased with a fluoro-silicon grease, said fluoro-silicon grease being additionally packed into a groove encircling the circumference of said piston.

18. The apparatus of claim 17 wherein said top and bottom engaging members are attached to said first cylinder by buttress threads.

19. The apparatus of claim 18 wherein the bottom of first cylinder is upwardly chamfered from its inside wall, and said bottom enclosing member has a mating chamfered lip to receive the chamfer of said first cylinder to reduce any tendency of said first cylinder to be expanded by combustion pressures.

20. The apparatus of claim 19 comprising means for restricting the exhaust gas flow path within the cavity of said piston rod, whereby when the combustion gases are ignited within the combustion chamber sufficient pressure is generated therewithin to exert opposite forces on said piston and said first cylinder.

21. A method for generating seismic waves comprising:
- suspending a weight above an earth surface,
- providing a piston within an elongated cavity of said suspended weight,
- providing means for introducing a combustion fuel to within the cavity on one side of said piston, and
- igniting said combustion fuel, whereby a force is applied to move said suspended weight to impact said earth surface and to generate seismic waves therebeneath.

22. A method for generating seismic waves comprising:
- suspending an elongated cylinder having a centrally-located cavity therein above an earth surface,
- disposing a piston within the cavity,
- securing a piston rod carrying said piston to a mounting frame,
- igniting a combustion fuel within the cavity to move said elongated cylinder a distance of approximately three times the diameter of said piston with respect to said piston so as to apply a force to move said cylinder to impact said earth surface and to generate seismic waves therebeneath.

* * * * *